US010938596B2

(12) United States Patent
Ogawa et al.

(10) Patent No.: US 10,938,596 B2
(45) Date of Patent: Mar. 2, 2021

(54) SWITCH DEVICE, COMMUNICATION CONTROL METHOD AND COMMUNICATION CONTROL PROGRAM

(71) Applicants: Sumitomo Electric Industries, Ltd., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihiro Ogawa, Osaka (JP); Akihito Iwata, Osaka (JP); Hirofumi Urayama, Osaka (JP); Takeshi Hagihara, Yokkaichi (JP); Yashuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/470,121

(22) PCT Filed: Aug. 2, 2017

(86) PCT No.: PCT/JP2017/028011
§ 371 (c)(1),
(2) Date: Jun. 14, 2019

(87) PCT Pub. No.: WO2018/109976
PCT Pub. Date: Jun. 21, 2018

(65) Prior Publication Data
US 2019/0319820 A1      Oct. 17, 2019

(30) Foreign Application Priority Data

Dec. 15, 2016 (JP) .............................. JP2016-242815

(51) Int. Cl.
*H04L 12/40* (2006.01)
*H04L 12/46* (2006.01)

(52) U.S. Cl.
CPC ........ *H04L 12/40163* (2013.01); *H04L 12/46* (2013.01); *H04L 2012/40215* (2013.01)

(58) Field of Classification Search
CPC ..... H04W 72/10; H04W 88/18; H04W 28/02; H04W 72/0406; H04M 3/00; H04B 7/15;
(Continued)

(56) References Cited

U.S. PATENT DOCUMENTS

| 2012/0127928 | A1  | 5/2012  | Ichihara |           |
|--------------|-----|---------|----------|-----------|
| 2016/0081055 | A1* | 3/2016  | Chika    | H04W 36/32 370/315 |
| 2018/0302907 | A1* | 10/2018 | Niina    | H04W 28/02 |

FOREIGN PATENT DOCUMENTS

| JP | 2001-235335 A | 8/2001 |
|----|---------------|--------|
| JP | 2004-064626 A | 2/2004 |

(Continued)

*Primary Examiner* — Dady Chery
(74) *Attorney, Agent, or Firm* — Baker Botts L.L.P.; Michael A. Sartori

(57) ABSTRACT

A switch device being equipped with an acquisition section for acquiring environmental information indicating the surrounding environment of a vehicle provided with a plurality of function sections; a switching section for performing relay processing for relaying communication data from at least one of the function sections to at least one of the other function sections; and a setting section for setting the priority level of the communication data in the relay processing on the basis of the environmental information acquired by the acquisition section.

7 Claims, 10 Drawing Sheets

| | | | TRAVELING STATE | | | |
|---|---|---|---|---|---|---|
| | | | TRAVELING | | STOPPED | |
| | | TYPE OF DEVICE | TYPE OF DATA | PRIORITY LEVEL | TYPE OF DEVICE | TYPE OF DATA | PRIORITY LEVEL |
| SURROUNDING ENVIRONMENT | ORDINARY ROAD | CAMERA | IMAGE INFORMATION | HIGH | CAMERA | IMAGE INFORMATION | MIDDLE |
| | | SENSOR | SENSOR INFORMATION | MIDDLE | SENSOR | SENSOR INFORMATION | MIDDLE |
| | | OUT-OF-VEHICLE COMMUNICATION DEVICE | MAP INFORMATION | LOW | OUT-OF-VEHICLE COMMUNICATION DEVICE | MAP INFORMATION | HIGH |
| | | | UPDATE INFORMATION | LOW | | UPDATE INFORMATION | LOW |
| | | | THEFT PREVENTION INFORMATION | LOW | | THEFT PREVENTION INFORMATION | LOW |
| | PARKING LOT | CAMERA | IMAGE INFORMATION | MIDDLE | CAMERA | IMAGE INFORMATION | LOW |
| | | SENSOR | SENSOR INFORMATION | HIGH | SENSOR | SENSOR INFORMATION | LOW |
| | | OUT-OF-VEHICLE COMMUNICATION DEVICE | MAP INFORMATION | LOW | OUT-OF-VEHICLE COMMUNICATION DEVICE | MAP INFORMATION | LOW |
| | | | UPDATE INFORMATION | LOW | | UPDATE INFORMATION | HIGH |
| | | | THEFT PREVENTION INFORMATION | LOW | | THEFT PREVENTION INFORMATION | HIGH |

(58) Field of Classification Search
CPC ............... H04L 12/40163; H04L 12/46; H04L 2012/40215; H04L 12/28; H04L 12/44
See application file for complete search history.

(56) References Cited

FOREIGN PATENT DOCUMENTS

| | | |
|---|---|---|
| JP | 2005-020299 A | 1/2005 |
| JP | 2005-341444 A | 12/2005 |
| JP | 2009-077412 A | 4/2009 |
| JP | 2009-284085 A | 12/2009 |
| JP | 2013-168865 A | 8/2013 |
| WO | 2011/055425 A | 5/2011 |

\* cited by examiner

F I G. 4

| PORT NUMBER | MAC ADDRESS OF CONNECTION DESTINATION DEVICE | VLAN ID | TYPE OF CONNECTION DESTINATION DEVICE |
|---|---|---|---|
| 1 | ADR1 | ID1 | CAMERA |
| 2 | ADR2 | ID1 | SENSOR |
| 3 | ADR3 | ID2 | OUT-OF-VEHICLE COMMUNICATION DEVICE |
| ⋮ | ⋮ | ⋮ | ⋮ |

Tab1

FIG. 5

Tab2

| TYPE OF DEVICE | TYPE OF DATA | PRIORITY LEVEL |
|---|---|---|
| CAMERA | IMAGE INFORMATION | HIGH |
| SENSOR | SENSOR INFORMATION | MIDDLE |
| OUT-OF-VEHICLE COMMUNICATION DEVICE | MAP INFORMATION | LOW |
| | UPDATE INFORMATION | LOW |
| | THEFT PREVENTION INFORMATION | LOW |
| | INTER-VEHICLE INFORMATION | MIDDLE |
| ALARM DEVICE | EARTHQUAKE DETECTION INFORMATION | LOW |
| ⋮ | ⋮ | ⋮ |

FIG. 9

| | | | TRAVELING STATE | | | | | |
|---|---|---|---|---|---|---|---|---|
| | | | TRAVELING (Tab11) | | | STOPPED (Tab12) | | |
| | | TYPE OF DEVICE | TYPE OF DATA | PRIORITY LEVEL | TYPE OF DEVICE | TYPE OF DATA | PRIORITY LEVEL |
| SURROUNDING ENVIRONMENT | ORDINARY ROAD | CAMERA | IMAGE INFORMATION | HIGH | CAMERA | IMAGE INFORMATION | MIDDLE |
| | | SENSOR | SENSOR INFORMATION | MIDDLE | SENSOR | SENSOR INFORMATION | MIDDLE |
| | | OUT-OF-VEHICLE COMMUNICATION DEVICE | MAP INFORMATION | LOW | OUT-OF-VEHICLE COMMUNICATION DEVICE | MAP INFORMATION | HIGH |
| | | | UPDATE INFORMATION | LOW | | UPDATE INFORMATION | LOW |
| | | | THEFT PREVENTION INFORMATION | LOW | | THEFT PREVENTION INFORMATION | LOW |
| | | TYPE OF DEVICE | TYPE OF DATA | PRIORITY LEVEL | TYPE OF DEVICE | TYPE OF DATA | PRIORITY LEVEL |
| | PARKING LOT (Tab21) | CAMERA | IMAGE INFORMATION | MIDDLE | CAMERA | IMAGE INFORMATION | LOW |
| | | SENSOR | SENSOR INFORMATION | HIGH | SENSOR | SENSOR INFORMATION | LOW |
| | | OUT-OF-VEHICLE COMMUNICATION DEVICE | MAP INFORMATION | LOW | OUT-OF-VEHICLE COMMUNICATION DEVICE | MAP INFORMATION | LOW |
| | | | UPDATE INFORMATION | LOW | | UPDATE INFORMATION | HIGH |
| | | | THEFT PREVENTION INFORMATION | LOW | | THEFT PREVENTION INFORMATION | HIGH |

M1, Tab22

SWITCH DEVICE, COMMUNICATION CONTROL METHOD AND COMMUNICATION CONTROL PROGRAM

CROSS-REFERENCE TO RELATED APPLICATIONS

This application is the national phase under 35 U.S.C. § 371 of PCT International Application No. PCT/JP2017/028011 which has an International filing date of Aug. 2, 2017 and designated the United States of America.

FIELD

The present disclosure relates to a switch device, a communication control method and a communication control program.

This application claims the priority based on Japanese Patent Application No. 2016-242815 filed on Dec. 15, 2016, and its disclosure is incorporated herein in its entirety.

BACKGROUND

Patent document 1 (Japanese Patent Application Laid-Open Publication No. 2013-168865) discloses the following on-vehicle network system. In other words, the on-vehicle network system is equipped with an on-vehicle control device having a memory for storing definition data defining portions that are included in communication protocols for use on an on-vehicle network and depend on implementation on the on-vehicle network and a communication protocol issuing device for issuing the definition data to the on-vehicle control device.

Upon receiving a registration request requesting to make the on-vehicle control device participate in the on-vehicle network from a registration device for making the on-vehicle control device participate in the on-vehicle network, the communication protocol issuing device performs authentication to the registration device, creates the definition data conforming to the implementation on the on-vehicle network and transmits the definition data to the registration device as a reply. The registration device receives the definition data transmitted by the communication protocol issuing device and requests the on-vehicle control device to store the received definition data on the memory. After that, the on-vehicle control device receives the definition data from the registration device, stores the definition data on the memory, and performs communication using the on-vehicle network while conforming to the communication protocols.

SUMMARY (1) The switch device of this disclosure is equipped with an acquisition section for acquiring environmental information indicating the surrounding environment of a vehicle provided with a plurality of function sections; a switch section for performing relay processing for relaying communication data from at least one of the function sections to at least one of the other function sections; and a setting section for setting the priority level of the communication data in the relay processing on the basis of the environmental information acquired by the acquisition section.

(6) The communication control method of this disclosure is a communication control method in a switch device, including a step of acquiring environmental information indicating the surrounding environment of a vehicle provided with a plurality of function sections; a step of performing relay processing for relaying communication data from at least one of the function sections to at least one of the other function sections; and a step of setting the priority level of the communication data in the relay processing on the basis of the acquired environmental information.

(7) The communication control program of this disclosure is a communication control program for use in a switch device, making a computer function as an acquisition section for acquiring environmental information indicating the surrounding environment of a vehicle provided with a plurality of function sections; a switching section for performing relay processing for relaying communication data from at least one of the function sections to at least one of the other function sections; and a setting section for setting the priority level of the communication data in the relay processing on the basis of the environmental information acquired by the acquisition section.

An embodiment of this disclosure can be achieved not only as the switch device equipped with these characteristic processing sections but also as an on-vehicle communication system equipped with the switch device. Furthermore, the embodiment of this disclosure can be achieved as a semiconductor integrated circuit achieving part of or whole of the switch device.

The above and further objects and features will more fully be apparent from the following detailed description with accompanying drawings.

BRIEF DESCRIPTION OF THE DRAWINGS

FIG. 4 is a view showing an example of an address table for use in the switch device according to the embodiment of the present disclosure;

FIG. 5 is a view showing an example of a priority table for use in the switch device according to the embodiment of the present disclosure;

FIG. 9 is a view showing an example of a priority matrix for use in the switch device according to the embodiment of the present disclosure.

DETAILED DESCRIPTION

Figure 1:
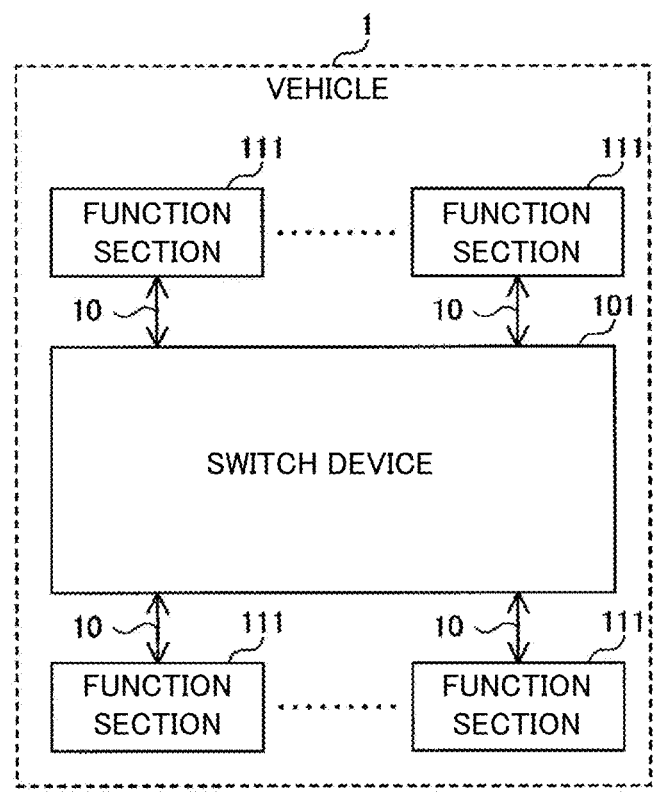
FIG. 1 is a view showing a configuration of an on-vehicle communication system according to an embodiment of the present disclosure.

Conventionally, on-vehicle network systems for improving security in on-vehicle networks have been developed.

Problem that the Invention is to Solve

The on-vehicle network described in Patent Document 1 is provided with a communication gateway for relaying information from the on-vehicle control device.

For example, priority levels are sometimes set for various pieces of information to be relayed by the communication gateway. The communication gateway preferentially relays pieces of information having higher priority levels.

However, some pieces of information are not suited to be used while the priority levels thereof are fixed. More specifically, for example, in image recognition, since the object recognition rate in an image changes depending on the brightness in the surroundings of the vehicle, if image information is used while the priority level thereof is fixed, the image information is sometimes transmitted preferentially even in the case that the surroundings of the vehicle become dark and there is a piece of information that should be more preferentially transmitted than the image information. In this case, information transmission efficiency is lowered.

This disclosure is intended to solve the above-mentioned problems, and an object thereof is to provide a switch device, a communication control method and a communication control program capable of efficiently transmitting information in an on-vehicle network.

Advantageous Effects

With this disclosure, information can be transmitted efficiently in an on-vehicle network.

Description of an Embodiment of the Present Disclosure

First, the contents of an embodiment of the present disclosure will be listed and described.

(1) The switch device according to the embodiment of the present disclosure is equipped with an acquisition section for acquiring environmental information indicating the surrounding environment of a vehicle provided with a plurality of function sections; a switching section for performing relay processing for relaying communication data from at least one of the function sections to at least one of the other function sections; and a setting section for setting the priority level of the communication data in the relay processing on the basis of the environmental information acquired by the acquisition section.

With this configuration, the priority level of communication data can be raised or lowered depending on the surrounding environment of the vehicle; in other words, the priority level of information can be applied flexibly. Hence, for example, in the case that there is information that should be transmitted more preferentially than image information, the priority level of the image information can be lowered, whereby it is possible to avoid a situation in which the information that should be transmitted preferentially is not transmitted or the transmission of the information is delayed. Consequently, information can be transmitted efficiently in the on-vehicle network.

(2) Preferably, the setting section determines whether the priority level of the communication data from the function section serving as a photographing device is higher or lower than the priority level of the communication data from the function section serving as a radar device on the basis of the illuminance in the surroundings of the vehicle indicated by the environmental information.

As described above, since the switch device is configured so as to determine whether the priority level of the communication data from the photographing device in which the recognition rate of an object changes depending on the illuminance in the surroundings of the vehicle is higher or lower than the priority level of the communication data from the radar device capable of recognizing an object regardless of the illuminance in the surroundings of the vehicle, the device can determine the respective priority levels appropriately.

(3) Preferably, the acquisition section further acquires the state information indicating the degree of wobbling of the vehicle, and the setting section sets the priority level on the basis of the degree of wobbling indicated by the state information acquired by the acquisition section.

With this configuration, the priority level of the communication data can be raised or lowered depending on the degree of wobbling of the vehicle; in other words, the priority level of information can be applied flexibly.

(4) More preferably, the vehicle is provided with the out-of-vehicle communication device serving as one of the function sections and being capable of communicating with an external device outside the vehicle, and in the case that the degree of wobbling satisfies a predetermined condition, the setting section raises the priority level of the communication data to be transmitted between the switching section and the out-of-vehicle communication device.

With this configuration, for example, in the case that an earthquake is detected on the basis of the degree of wobbling of the vehicle and the detection is notified to a host device via the out-of-vehicle communication device, when the degree of wobbling satisfies the predetermined condition, the earthquake detection information can be preferentially transmitted to the out-of-vehicle communication device, whereby the detection result can be promptly transmitted to the host device.

(5) Preferably, the acquisition section further acquires the state information indicating the traveling state of the vehicle, and the setting section sets the priority level depending on the combination of the surrounding environment indicated by the environmental information acquired by the acquisition section and the traveling state indicated by the state information acquired by the acquisition section.

Even in the same surrounding environment of the vehicle, a case is conceivable in which the priority level should be changed depending on the traveling state. Also in this case, an appropriate priority level can be set depending on the surrounding environment and the traveling state.

(6) The communication control method according to the embodiment of the present disclosure is a communication control method in a switch device, including a step of acquiring environmental information indicating the surrounding environment of a vehicle provided with a plurality of function sections; a step of performing relay processing for relaying communication data from at least one of the function sections to at least one of the other function sections; and a step of setting the priority level of the communication data in the relay processing on the basis of the acquired environmental information.

With this configuration, the priority level of communication data can be raised or lowered depending on the surrounding environment of the vehicle; in other words, the priority level of information can be applied flexibly. Hence, for example, in the case that there is information that should be transmitted more preferentially than image information, the priority level of the image information can be lowered, whereby it is possible to avoid a situation in which the information that should be transmitted preferentially is not transmitted or the transmission of the information is delayed. Consequently, information can be transmitted efficiently in the on-vehicle network.

(7) The communication control program according to the embodiment of the present disclosure is a communication control program for use in a switch device, making a computer function as an acquisition section for acquiring environmental information indicating the surrounding environment of a vehicle provided with a plurality of function sections; a switching section for performing relay processing for relaying communication data from at least one of the function sections to at least one of the other function sections; and a setting section for setting the priority level of the communication data in the relay processing on the basis of the environmental information acquired by the acquisition section.

With this configuration, the priority level of communication data can be raised or lowered depending on the surrounding environment of the vehicle; in other words, the priority level of information can be applied flexibly. Hence, for example, in the case that there is information that should be transmitted more preferentially than image information, the priority level of the image information can be lowered, whereby it is possible to avoid a situation in which the information that should be transmitted preferentially is not transmitted or the transmission of the information is delayed. Consequently, information can be transmitted efficiently in the on-vehicle network.

The embodiment of the present disclosure will be described below referring to the drawings. The same or equivalent components in the drawings are designated by the same reference numerals, and the descriptions thereof are not repeated. Furthermore, at least portions of the embodiment described below may be combined arbitrarily.

[Configuration and Basic Operation]

FIG. 1 is a view showing a configuration of an on-vehicle communication system according to an embodiment of the present disclosure.

Referring to FIG. 1, an on-vehicle communication system 301 is equipped with a switch device 101 and a plurality of function sections 111. The on-vehicle communication system 301 is mounted on a vehicle 1.

The switch device 101 is connected to the plurality of function sections 111, for example, by Ethernet (registered trademark) cables 10 and can communicate with the plurality of function sections 111 connected thereto. Information is exchanged between the switch device 101 and the function sections 111, for example, by using Ethernet frames.

Figure 2:
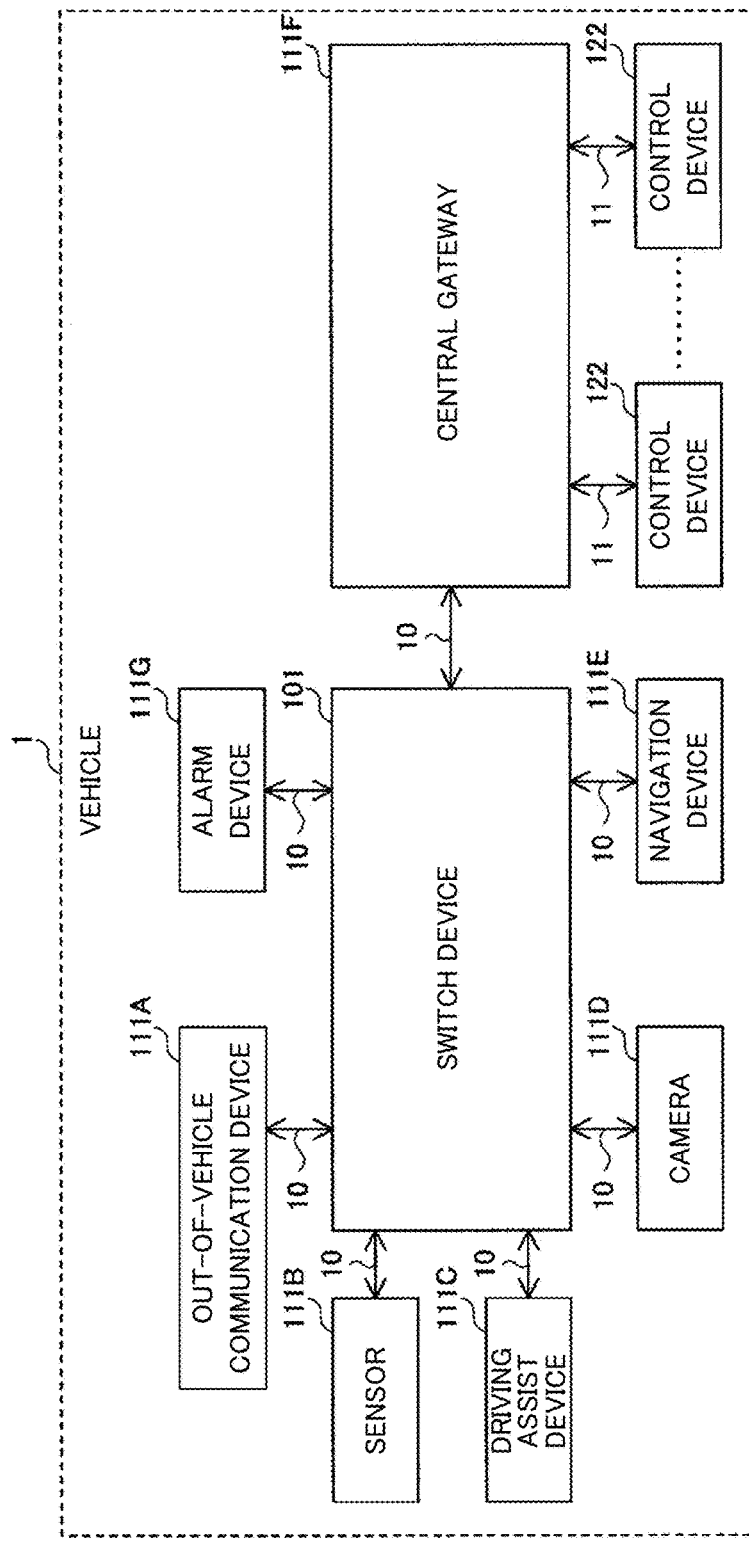
FIG. 2 is a view showing an application example of the on-vehicle communication system according to the embodiment of the present disclosure.

FIG. 2 is a view showing an application example of the on-vehicle communication system according to the embodiment of the present disclosure.

Referring to FIG. 2, in an application example of the on-vehicle communication system 301, the switch device 101 is connected to, for example, an out-of-vehicle communication device 111A, a sensor 111B, a driving assist device 111C, a camera 111D, a navigation device 111E, a central gateway 111F, and an alarm device 111G by Ethernet cables 10.

The out-of-vehicle communication device 111A, the sensor 111B, the driving assist device 111C, the camera 111D, the navigation device 111E, the central gateway 111F, and the alarm device 111G are examples of the function sections 111.

The out-of-vehicle communication device 111A can communicate with a server 171 outside the vehicle 1.

More specifically, for example, the out-of-vehicle communication device 111A is a TCU (Telematics Communication Unit) and can perform wireless communication with a wireless base station device 161 according to a communication standard, such as LTE (Long Term Evolution) or 3G.

The out-of-vehicle communication device 111A can communicate with the server 171 via the wireless base station device 161.

Furthermore, the out-of-vehicle communication device 111A acquires the position of the vehicle 1 incorporating the device on the basis of the radio waves from the GPS (Global Positioning System) satellites, for example, at predetermined intervals and creates position information indicating the acquired position.

The switch device 101 transmits Ethernet frames received from a certain function section 111 to another function section 111 depending on the destination of the Ethernet frames.

In more detail, the switch device 101 transmits the Ethernet frames to the destination function section 111 on the basis of the transmission source MAC (Media Access Control) address and the destination MAC address included in the received Ethernet frames.

Examples of control devices 122 include an engine control device, an AT (Automatic Transmission) control device, an HEV (Hybrid Electric Vehicle) control device, a brake control device, a chassis control device, a steering control device, an instrument display control device and theft detection device.

The central gateway 111F is connected to the respective control devices 122 via, for example, CAN buses 11 conforming to the CAN (Controller Area Network) (registered trademark) standard.

The central gateway 111F performs information relay processing, for example, between the control devices 122 respectively connected to different CAN buses 11 and also performs information relay processing between the switch device 101 and the control devices 122.

The central gateway 111F relays, for example, yaw rate information indicating the yaw rate of the vehicle 1, vehicle speed information indicating the vehicle speed of the vehicle 1, the acceleration information indicating the acceleration of the vehicle 1, illuminance information indicating the illuminance in the surroundings of the vehicle 1, and theft prevention information indicating the theft detection result of the vehicle 1. Information to be transmitted via the CAN buses 11 is hereafter also referred to as CAN information.

The sensor 111B is, for example, a radar device using millimeter waves and periodically creates Ethernet frames including sensor information. The sensor information herein indicates the detection result of an object, such as a pedestrian, in the surroundings of the vehicle.

The sensor 111B sets the destination MAC address of the created Ethernet frames to the MAC address of the driving assist device 111C and then transmits the Ethernet frames to the driving assist device 111C via the switch device 101.

The camera 111D is, for example, a photographing device for periodically photographing the surroundings of the vehicle 1; after photographing the surroundings of the vehicle 1, the device creates image information indicating the result of the photographing. The camera 111D creates Ethernet frames including the image information, sets the destination MAC address of the created Ethernet frames to the MAC address of the driving assist device 111C and then transmits the Ethernet frames to the driving assist device 111C via the switch device 101.

The alarm device 111G detects an earthquake, for example, on the basis of the CAN information, such as the yaw rate information, the vehicle speed information and the acceleration information. Upon detecting an earthquake, the alarm device 111G transmits earthquake detection information indicating the detection result to the server 171 via the switch device 101 and the out-of-vehicle communication device 111A.

Although the on-vehicle communication system according to the embodiment of the present disclosure is configured so as to be provided with the central gateway 111F, the configuration thereof is not limited to this configuration. The on-vehicle communication system 301 may also be configured so as not to be provided with the central gateway 111F. In this case, the switch device 101 relays the CAN information to be transmitted via the CAN buses 11.

Figure 3:
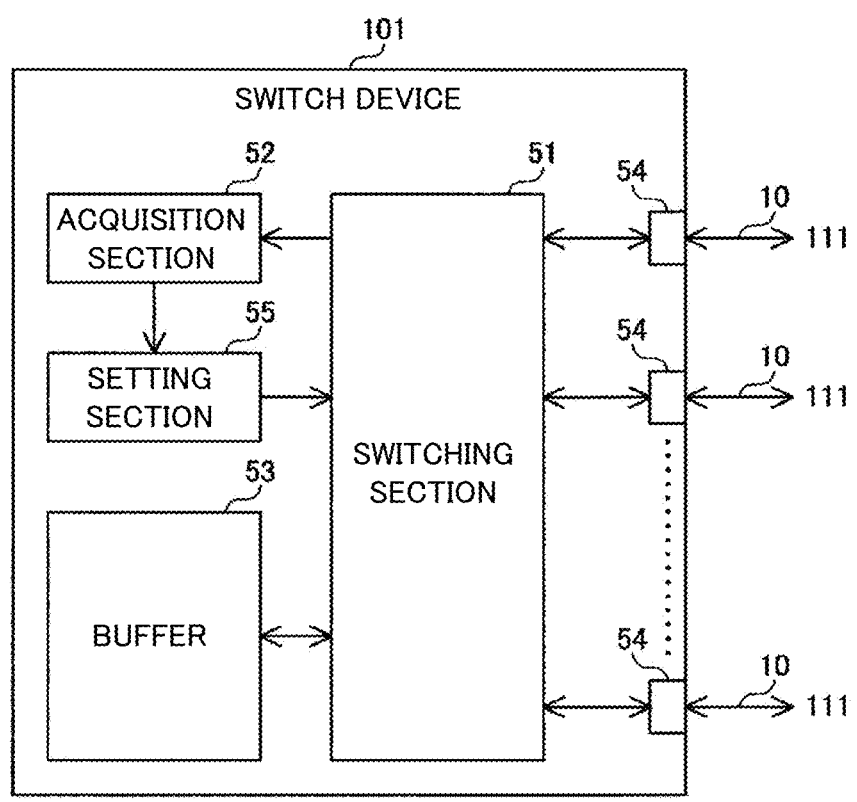
FIG. 3 is a view showing a configuration of a switch device in the on-vehicle communication system according to the embodiment of the present disclosure.

FIG. 3 is a view showing a configuration of the switch device in the on-vehicle communication system according to the embodiment of the present disclosure.

Referring to FIG. 3, the switch device 101 is equipped with a switching section 51, an acquisition section 52, a buffer 53, a plurality of communication ports 54 and a setting section 55.

The communication ports 54 in the switch device 101 are terminals to which, for example, the Ethernet cables 10 can be connected. The communication ports 54 may be terminals of an integrated circuit.

Each of the plurality of communication ports 54 is connected to any one of the plurality of function sections 111 via the Ethernet cable 10.

Furthermore, each of the plurality of communication ports 54 is, for example, made to correspond to VLAN (Virtual Local Area Network). More specifically, the sensor 111B, the driving assist device 111C, the camera 111D, the navigation device 111E, the central gateway 111F and the alarm device 111G belong to a VLAN 1. Moreover, the out-of-vehicle communication device 111A belongs to a VLAN 2 that is different from the VLAN 1.

FIG. 4 is a view showing an example of an address table for use in the switch device according to the embodiment of the present disclosure.

Referring to FIG. 4, the switching section 51 holds an address table Tab 1 indicating, for example, the correspondence relationship among the port numbers of the communication ports 54, the MAC addresses of the connection destination devices, the IDs of the connection destination VLANs and the types of the connection destination devices. The address table Tab 1 is set, for example, by the user and is used statically.

FIG. 5 is a view showing an example of a priority table for use in the switch device according to the embodiment of the present disclosure.

Referring to FIG. 5, the switching section 51 holds a priority table Tab 2 indicating, for example, the correspondence relationship among the types of the devices, the types of data to be transmitted/received by the devices (hereafter also referred to as data types) and priority levels.

In this example, examples of the data types include "image information", "sensor information", "map information", "update information", "theft prevention information", "inter-vehicle information" and "earthquake detection information".

The "map information" is information that is used to display a map on the navigation device 111E, and the information is transmitted from the server 171 to the navigation device 111E via the out-of-vehicle communication device 111A and the switch device 101.

The "update information" is information for reprogramming the firmware in the control devices 122, and the information is transmitted from the server 171 to the control devices 122 via the out-of-vehicle communication device 111A, the switch device 101 and the central gateway 111F.

The "inter-vehicle information" is information relating to driving assistance, and the information is transmitted from another vehicle 1 to the driving assist device 111C via the out-of-vehicle communication device 111A and the switch device 101.

When the theft detection device detects the theft of the vehicle 1, the "theft prevention information" is transmitted from the theft detection device to the server 171 via the central gateway 111F, the switch device 101, the out-of-vehicle communication device 111A and the wireless base station device 161.

In the priority table Tab 2, in the case that such a single device as the out-of-vehicle communication device 111A transmits and receives plural types of data, the plural types of data are specified for the single device.

More specifically, in the priority table Tab 2, "map information", "update information", "theft prevention information" and "inter-vehicle information" are specified as the "data types" of the out-of-vehicle communication device 111A.

These types of information can be distinguished by, for example, port numbers for identifying applications, such as port numbers stored in the TCP (Transmission Control Protocol) packets or UDP (User Datagram Protocol) packets included in Ethernet frames.

Figure 6:
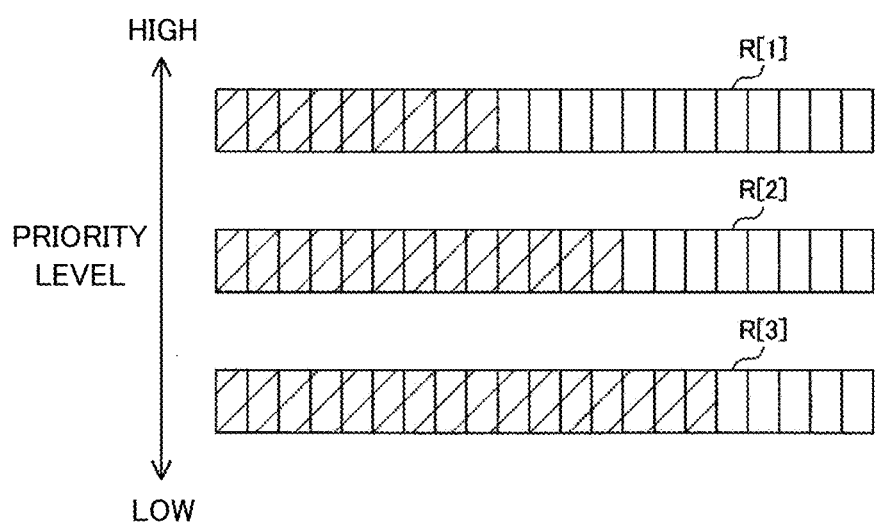
FIG. 6 is a view showing examples of communication data storage formats in a buffer according to the embodiment of the present disclosure.

FIG. 6 is a view showing examples of communication data storage formats in the buffer according to the embodiment of the present disclosure.

Referring to FIG. 6, a plurality of queues for storing communication data is provided in the buffer 53.

More specifically, for example, three regions R[n] (herein, n is an integer between 1 and 3) corresponding to priority levels are provided as examples of the plurality of queues in the buffer 53. Communication data having a higher priority level is stored in a region having a smaller value of n. In other words, communication data having a lower priority level is stored in a region having a larger value of n.

In more detail, the regions R[1], R[2] and R[3] correspond to priority levels "high", "middle" and "low" in the priority table Tab 2, respectively. Two or four or more regions R may also be provided in the buffer 53.

Referring again to FIG. 3, the switching section 51 performs relay processing for relaying communication data from the function sections 111 to the other function sections 111.

More specifically, the switching section 51 operates, for example, as an L2 switch; upon receiving Ethernet frames from the camera 111D, the switching section 51 confirms the transmission source MAC address and the destination MAC address in the received Ethernet frames.

Furthermore, the switching section 51 recognizes having received the Ethernet frames from "camera" on the basis of the reception source communication port 54 or the transmission source MAC address and the address table Tab 1, and then recognizes that the type and the priority level of the data are "image information" and "high", respectively, on the basis of the recognition result and the priority table Tab 2.

The switching section 51 stores the Ethernet frames in the region R[1] on the basis of the recognized priority level.

Similarly, upon receiving Ethernet frames, for example, from the sensor 111B, the switching section 51 confirms the transmission source MAC address and the destination MAC address in the received Ethernet frames.

Furthermore, the switching section 51 recognizes having received the Ethernet frames from "sensor" on the basis of the reception source communication port 54 or the transmission source MAC address and the address table Tab 1, and then recognizes that the type and the priority level of the data are "sensor information" and "middle", respectively, on the basis of the recognition result and the priority table Tab 2.

The switching section 51 stores the Ethernet frames in the region R[2] on the basis of the recognized priority level.

The switching section 51 preferentially transmits the Ethernet frames selected from among the Ethernet frames stored in the buffer 53 and stored in the region having the high priority level to the transmission destination device.

Moreover, the switching section 51 can operate as an L3 switch or an L4 switch. The switching section 51 also relays the Ethernet frames to be transmitted between the function sections 111 belonging to different LANs depending on the priority level as in the case of the Ethernet frames to be transmitted between the function sections 111 belonging to the same VLAN.

The acquisition section 52 acquires the environmental information of the vehicle 1 provided with the plurality of function sections 111. More specifically, the acquisition section 52 acquires, for example, image information serving as an example of the environmental information.

In more detail, the acquisition section 52 refers to, for example, the address table Tab 1 and the priority table Tab 2 stored in the switching section 51 and recognizes that the port number of the communication port 54 corresponding to the image information is 1.

When the switching section 51 receives Ethernet frames via the communication port 54 having port number 1, the acquisition section 52 acquires image information from the Ethernet frames and outputs the acquired image information to the setting section 55.

The setting section 55 sets the priority level of the communication data in the relay processing on the basis of the environmental information acquired by the acquisition section 52.

In more detail, the setting section 55, for example, determines whether the priority level of the communication data from the camera 111D is higher or lower than the priority level of the communication data from the sensor 111B on the basis of the illuminance IL in the surroundings of the vehicle 1 indicated by the environmental information.

More specifically, upon receiving the image information from the acquisition section 52, the setting section 55 calculates the illuminance IL in the surroundings of the vehicle 1 by analyzing the image indicated by the received image information.

For example, in the case that the calculated illuminance IL is smaller than a predetermined threshold value Th1, the setting section 55 judges that the surroundings of the vehicle 1 are dark and determines to set the priority level of the image information and the priority level of the sensor information to "middle" and "high", respectively.

On the other hand, for example, in the case that the calculated illuminance IL is equal to the threshold value Th1 or more, the setting section 55 judges that the surroundings of the vehicle 1 are bright and determines to set the priority level of the image information and the priority level of the sensor information to "high" and "middle", respectively.

The setting section 55 writes the determination result of the priority levels on the priority table Tab 2. In more detail, the setting section 55 monitors, for example, the storage state of the communication data in the buffer 53, and when a state occurs in which no communication data is stored in the buffer 53, the setting section 55 writes the determination result of the priority levels on the priority table Tab 2.

[Operation Flow]

Each of the devices in the on-vehicle communication system 301 is equipped with a computer, and the arithmetic processing section, such as a CPU, in the computer reads a program including part of or all of the steps of the following sequence diagram or flow chart from a memory, not shown, and executes the program. Each of the programs of the plurality of devices can be installed from the outside. Each of the programs of the plurality of devices is distributed in a state of being stored on a recording medium.

Figure 7:
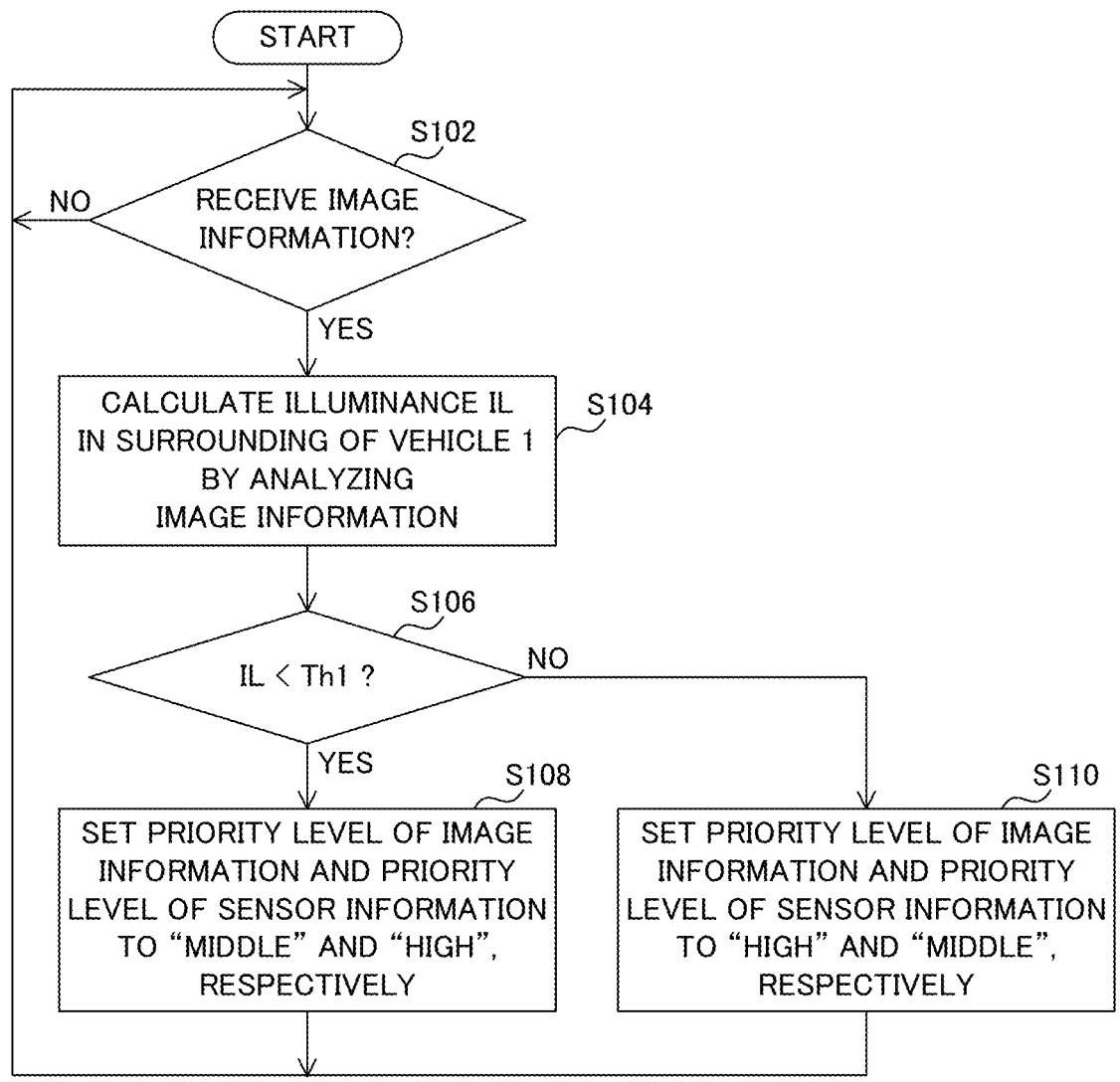
FIG. 7 is a flow chart specifying the operation procedure at the time when the switch device in the on-vehicle communication system according to the embodiment of the present disclosure determines the priority levels of communication data.

FIG. 7 is a flow chart specifying the operation procedure at the time when the switch device in the on-vehicle communication system according to the embodiment of the present disclosure determines the priority levels of communication data.

Referring to FIG. 7, the switch device 101 first stands by until the device receives the Ethernet frames including image information (NO at step S102).

Upon receiving the Ethernet frames including the image information (YES at step S102), the switch device 101 calculates the illuminance IL in the surroundings of the vehicle 1 by analyzing the received image information (at step S104).

Next, in the case that the calculated illuminance IL is smaller than the threshold value Th1 (YES at step S106), the switch device 101 sets the priority level of the image information and the priority level of the sensor information to "middle" and "high", respectively (at step S108).

On the other hand, in the case that the calculated illuminance IL is equal to the threshold value or more (NO at step S106), the switch device 101 sets the priority level of the image information and the priority level of the sensor information to "high" and "middle", respectively (at step S110).

Next, after setting the priority level of the image information and the priority level of the sensor information (at steps S108 and S110), the switch device 101 stands by until the device receives the Ethernet frames including new image information (NO at step S102).

Although the switch device 101 is configured so as to calculate the illuminance IL in the surroundings of the vehicle 1 using image information at the above-mentioned step S104, the configuration of the device is not limited to this configuration. The switch device 101 may also be configured, for example, so as to acquire illuminance information to be transmitted via the CAN bus 11 and so as to acquire the illuminance IL in the surroundings of the vehicle 1 from the acquired illuminance information.

Furthermore, although the switch device 101 is configured so as to set the priority level of the image information and the priority level of the sensor information at the above-mentioned steps S108 and S110, the configuration of the device is not limited to this configuration. The switch device 101 may also be configured so as to set the priority levels of other types of information.

[Modification 1]

Referring again to FIG. 3, the acquisition section 52 acquires, for example, state information S1 indicating the degree of wobbling of the vehicle 1. More specifically, the acquisition section 52 acquires yaw rate information serving as an example of the state information S1.

In more detail, the acquisition section 52 transmits a transfer instruction T1 for transferring, for example, the yaw rate information, the vehicle speed information and the acceleration information to the central gateway 111F via the switching section 51.

Referring again to FIG. 2, each of the yaw rate information, the vehicle speed information and the acceleration information is included, for example, in messages and transmitted periodically via the CAN buses 11.

Upon receiving the transfer instruction T1 from the switch device 101, the central gateway 111F monitors the messages to be transmitted via the CAN buses 11 according to the received transfer instruction T1.

Furthermore, when a message including information to be transferred, i.e., the yaw rate information, the vehicle speed information or the acceleration information, is transmitted, the central gateway 111F acquires the information to be transferred from the message and transmits the Ethernet frames including the acquired information to the switch device 101.

The configuration of the central gateway 111F is not limited to the configuration in which each time the information to be transferred is acquired, the acquired information is transmitted to the switch device 101, but the central gateway 111F may also be configured so as to store a plurality of pieces of information to be transferred and so as to collectively transmit the stored information.

Referring again to FIG. 3, upon receiving the Ethernet frames including the information to be transferred from the central gateway 111F via the switching section 51, the acquisition section 52 in the switch device 101 acquires the information to be transferred from the received Ethernet frames.

The acquisition section 52 outputs the acquired information to be transferred, such as the yaw rate information, the vehicle speed information and the acceleration information, to the setting section 55.

The setting section 55 sets priority levels, for example, on the basis of the degree of wobbling indicated by the state information S1.

In detail, for example, in the case that the degree of wobbling satisfies a predetermined condition, the setting section 55 raises the priority level of the communication data to be transmitted between the setting section 55 and the out-of-vehicle communication device 111A.

In more detail, upon receiving the yaw rate information, the vehicle speed information and the acceleration information from the acquisition section 52, the setting section 55 performs the following processing.

In other words, the setting section 55 judges whether the vehicle 1 is in a stopped state on the basis of the vehicle speed information and the acceleration information.

In detail, the setting section 55 judges whether the vehicle 1 is in a stopped state, for example, on the basis of the traveling state based on the vehicle speed information and the acceleration information and on the basis of the duration time of the traveling state.

In more detail, for example, in the case that the state in which the vehicle speed is zero continues for a certain period of time or more, the setting section 55 judges that the vehicle 1 is in a stopped state.

Furthermore, the setting section 55 judges whether the vehicle 1 is wobbling on the basis of the yaw rate information.

In more detail, in the case that the yaw rate indicated by the yaw rate information is larger than a predetermined threshold value Th2, the setting section 55 judges that the vehicle 1 is wobbling. On the other hand, in the case that the yaw rate is smaller than the threshold value Th2, the setting section 55 judges that the vehicle 1 is not wobbling.

For example, in the case that the setting section 55 judges that the vehicle 1 is in a stopped state and also judges that the vehicle 1 is wobbling, the setting section 55 decides that an earthquake has occurred and determines to set the priority level of the earthquake detection information to be transmitted from the alarm device 111G to the out-of-vehicle communication device 111A via the switch device 101 incorporating the setting section to "high".

On the other hand, for example, in the case that the setting section 55 judges that the vehicle 1 is not in a stopped state or judges that the vehicle 1 is not wobbling, the setting section 55 decides that no earthquake has occurred and determines to set the priority level of the earthquake detection information to be transmitted from the alarm device 111G to the out-of-vehicle communication device 111A via the switch device 101 incorporating the setting section to "low".

The setting section 55 writes the determination result of the priority level on the priority table Tab 2.

[Operation Flow]

Figure 8:
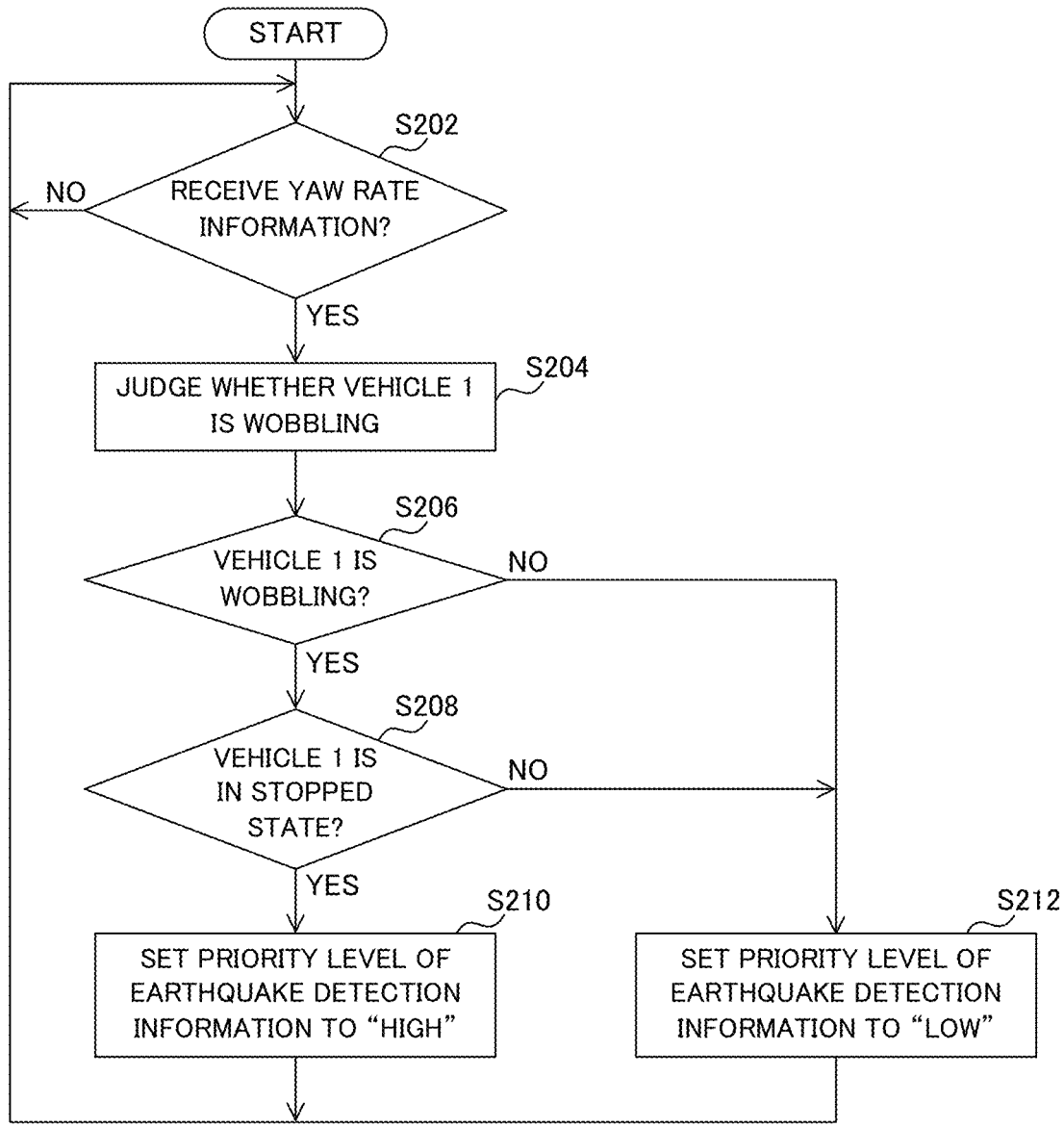
FIG. 8 is a flow chart specifying the operation procedure at the time when the switch device in the on-vehicle communication system according to the embodiment of the present disclosure determines the priority level of communication data.

FIG. 8 is a flow chart specifying the operation procedure at the time when the switch device in the on-vehicle communication system according to the embodiment of the present disclosure determines the priority level of communication data.

Referring to FIG. 8, it is assumed that the switch device 101 receives the speed information and the acceleration information transmitted periodically from the central gateway 111F and judges whether the vehicle 1 is in a stopped state on the basis of the received information.

First, the switch device 101 stands by until the device receives the Ethernet frames including the yaw rate information (NO at step S202).

And then, upon receiving the Ethernet frames including the yaw rate information (YES at step S202), the switch device 101 judges whether the vehicle 1 is wobbling on the basis of the received yaw rate information (at step S204).

Next, in the case that the switch device 101 judges that the vehicle 1 is wobbling and that the vehicle 1 is in a stopped state (YES at step S206 and YES at step S208), the switch device 101 sets the priority level of the earthquake detection information to "high" (at step S210).

On the other hand, in the case that the switch device 101 judges that the vehicle 1 is not wobbling (NO at step S206) or that although the vehicle 1 is wobbling, the vehicle 1 is not in a stopped state (YES at step S206 and NO at step S208), the switch device 101 sets the priority level of the earthquake detection information to "low" (at step S212).

Next, after setting the priority level of the earthquake detection information (at step S210 and step S212), the switch device 101 stands by until the device receives the Ethernet frames including new yaw rate information (NO at step S202).

Although the switch device 101 is configured so as to set the priority level of the earthquake detection information at the above-mentioned steps S210 and S212, the configuration of the device is not limited to this configuration. The switch device 101 may also be configured so as to set the priority levels of other types of information.

[Modification 2]

Referring again to FIG. 3, the acquisition section 52 acquires, for example, state information S2 indicating the traveling state of the vehicle 1. More specifically, the acquisition section 52 acquires vehicle speed information and acceleration information serving as examples of the state information S2.

In more detail, the acquisition section 52 transmits a transfer instruction T2 for transferring, for example, the vehicle speed information and the acceleration information to the central gateway 111F via the switching section 51 and acquires the vehicle speed information and the acceleration information from the central gateway 111F in response to the transfer instruction T2. The acquisition section 52 outputs the acquired vehicle speed information and acceleration information to the setting section 55.

The setting section 55 sets the priority level of the communication data in relay processing on the basis of, for example, the traveling state indicated by the state information S2 acquired by the acquisition section 52. In detail, the setting section 55 sets the priority level of the communication data in the relay processing on the basis of, for example, the traveling state indicated by the state information S2 and the duration time of the traveling state.

In more detail, the setting section 55 judges whether the vehicle 1 is traveling on an expressway on the basis of the traveling state based on the vehicle speed information and the acceleration information and on the basis of the duration time of the traveling state.

In more detail, for example, in the case that the state in which the vehicle speed is larger than a predetermined threshold value Th3 continues for a certain period of time or more, the setting section 55 judges that the vehicle 1 is traveling on an expressway.

For example, in the case that the setting section 55 judges that the vehicle 1 is traveling on an expressway, the setting section 55 decides that a risk of colliding with a pedestrian is reduced and determines to set the priority level of the sensor information to be transmitted from the sensor 111B to the driving assist device 111C via the switch device 101 incorporating the setting section and the priority level of the inter-vehicle information to be transmitted from the out-of-vehicle communication device 111A to the driving assist device 111C via the switch device 101 incorporating the setting section to "middle" and "high", respectively.

On the other hand, for example, in the case that the setting section 55 judges that the vehicle 1 is not traveling on an expressway, the setting section 55 decides that a risk of colliding with a pedestrian is increased and determines to set the priority level of the sensor information and the priority level of the inter-vehicle information to "high" and "middle", respectively. The setting section 55 writes the determination result of the priority levels on the priority table Tab 2.

[Modification 3]

The setting section 55 sets priority levels, for example, on the basis of the vehicle speed information and the acceleration information acquired by the acquisition section 52.

In detail, the setting section 55 judges whether the vehicle 1 is in a stopped state, for example, on the basis of the traveling state based on the vehicle speed information and the acceleration information and on the basis of the duration time of the traveling state.

For example, in the case that the setting section 55 judges that the vehicle 1 is in a stopped state, the setting section 55 determines to set the priority level of update information to "high" so that the reprogramming of the firmware in the control devices 122 is performed efficiently.

On the other hand, for example, in the case that the setting section 55 judges that the vehicle 1 is not in a stopped state, the setting section 55 decides that information different from the update information should be preferentially relayed and determines to set the priority level of the update information to "low". The setting section 55 writes the determination result of the priority level on the priority table Tab 2.

[Modification 4]

The setting section 55 sets priority levels, for example, on the basis of the vehicle speed information and the acceleration information acquired by the acquisition section 52.

In detail, the setting section 55 judges whether the vehicle 1 is in a stopped state, for example, on the basis of the traveling state based on the vehicle speed information and the acceleration information and on the basis of the duration time of the traveling state.

For example, in the case that the setting section 55 judges that the vehicle 1 is in a stopped state, the setting section 55 decides that the possibility that the vehicle 1 is thieved is increased and determines to set the priority level of the theft prevention information to "high".

On the other hand, for example, in the case that the setting section 55 judges that the vehicle 1 is not in a stopped state, the setting section 55 decides that the possibility that the vehicle 1 is thieved is decreased and determines to set the priority level of the theft prevention information to "low". The setting section 55 writes the determination result of the priority level on the priority table Tab 2.

[Modification 5]

The acquisition section 52 acquires, for example, the state information S2 and the environmental information. The state information S2 is herein, for example, the vehicle speed information and the acceleration information. Furthermore, the environmental information is, for example, the position information and the map information.

In more detail, the acquisition section 52 transmits the transfer instruction T2 to the central gateway 111F via the switching section 51 and acquires the vehicle speed information and the acceleration information from the central gateway 111F in response to the transfer instruction T2. The acquisition section 52 outputs the acquired vehicle speed information and acceleration information to the setting section 55.

Moreover, the acquisition section 52 transmits, for example, a transmission instruction for transmitting the position information to the out-of-vehicle communication device 111A via the switching section 51.

What's more, the acquisition section 52 transmits, for example, a transfer instruction T4 for transferring the map information to the navigation device 111E via the switching section 51.

Referring again to FIG. 2, upon receiving the transmission instruction from the switch device 101, the out-of-vehicle communication device 111A periodically creates the position information according to the received transmission instruction and transmits the Ethernet frames including the created position information to the switch device 101.

Upon receiving the transfer instruction T4 from the switch device 101, the navigation device 111E transmits the Ethernet frames including the map information to the switch device 101 according to the received transfer instruction T4.

Referring again to FIG. 3, upon receiving the Ethernet frames including the position information from the out-of-vehicle communication device 111A via the switching section 51, the acquisition section 52 in the switch device 101 acquires the position information from the received Ethernet frames and outputs the acquired position information to the setting section 55.

Still further, upon receiving the Ethernet frames including the map information from the navigation device 111E via the switching section 51, the acquisition section 52 acquires the map information from the received Ethernet frames and outputs the acquired map information to the setting section 55.

FIG. 9 is a view showing an example of a priority matrix for use in the switch device according to the embodiment of the present disclosure.

Referring to FIG. 9, the setting section 55 sets priority levels, for example, depending on the combination of the surrounding environment of the vehicle 1 indicated by the environmental information acquired by the acquisition section 52 and the traveling state indicated by the state information S2 acquired by the acquisition section 52.

In more detail, the setting section 55 holds, for example, a priority matrix M1. The priority matrix M1 includes a priority table for each of the surrounding environment and the traveling state.

In this example, the surrounding environment corresponds to "ordinary road" and "parking lot". The traveling state corresponds to "traveling" and "stopped".

The priority matrix M1 includes a priority table Tab 11 corresponding to "ordinary road" and "traveling", a priority table Tab 12 corresponding to "ordinary road" and "stopped", a priority table Tab 21 corresponding to "parking lot" and "traveling", and a priority table Tab 22 corresponding to "parking lot" and "stopped".

In the priority table Tab 11, the priority level of the image information to be used to assist driving during the ordinary traveling of the vehicle 1 is high. In the priority table Tab 12, since the vehicle 1 stops temporarily, the priority level of the image information is low, and the priority level of the map information is high. In the priority table Tab 21, since the vehicle 1 has a high possibility of approaching a pedestrian, the priority level of the sensor information is high. In the priority table Tab 22, since the vehicle 1 does not travel, the priority levels of the update information and the theft prevention information are high.

The setting section 55 judges whether the traveling state of the vehicle 1 is "traveling" or "stopped" on the basis of the vehicle speed information and the acceleration information acquired by the acquisition section 52.

More specifically, in the case that the state in which the vehicle speed is zero continues for a certain period of time or more, the setting section 55 judges that the vehicle 1 is in a stopped state, and in the case that the state is different from the above-mentioned state, the setting section 55 judges that the vehicle 1 is traveling.

Furthermore, the setting section 55 judges whether the vehicle 1 is positioned on "ordinary road" or in "parking lot" on the basis of the position information and the map information acquired by the acquisition section 52.

In the case that the state of the vehicle 1 has changed, in more detail, in the case that at least either one of the judgment result of the traveling state and the judgment result of the surrounding environment has changed, the setting section 55 performs the following processing.

That is to say, the setting section 55 selects the priority table corresponding to the most recent judgment result from among the priority tables Tab 11, Tab 12, Tab 21 and Tab 22 included in the priority matrix M1. After that, the setting section 55 rewrites the content of the priority table being held by the switching section 51 with the content of the selected priority table.

[Operation Flow]

Figure 10:
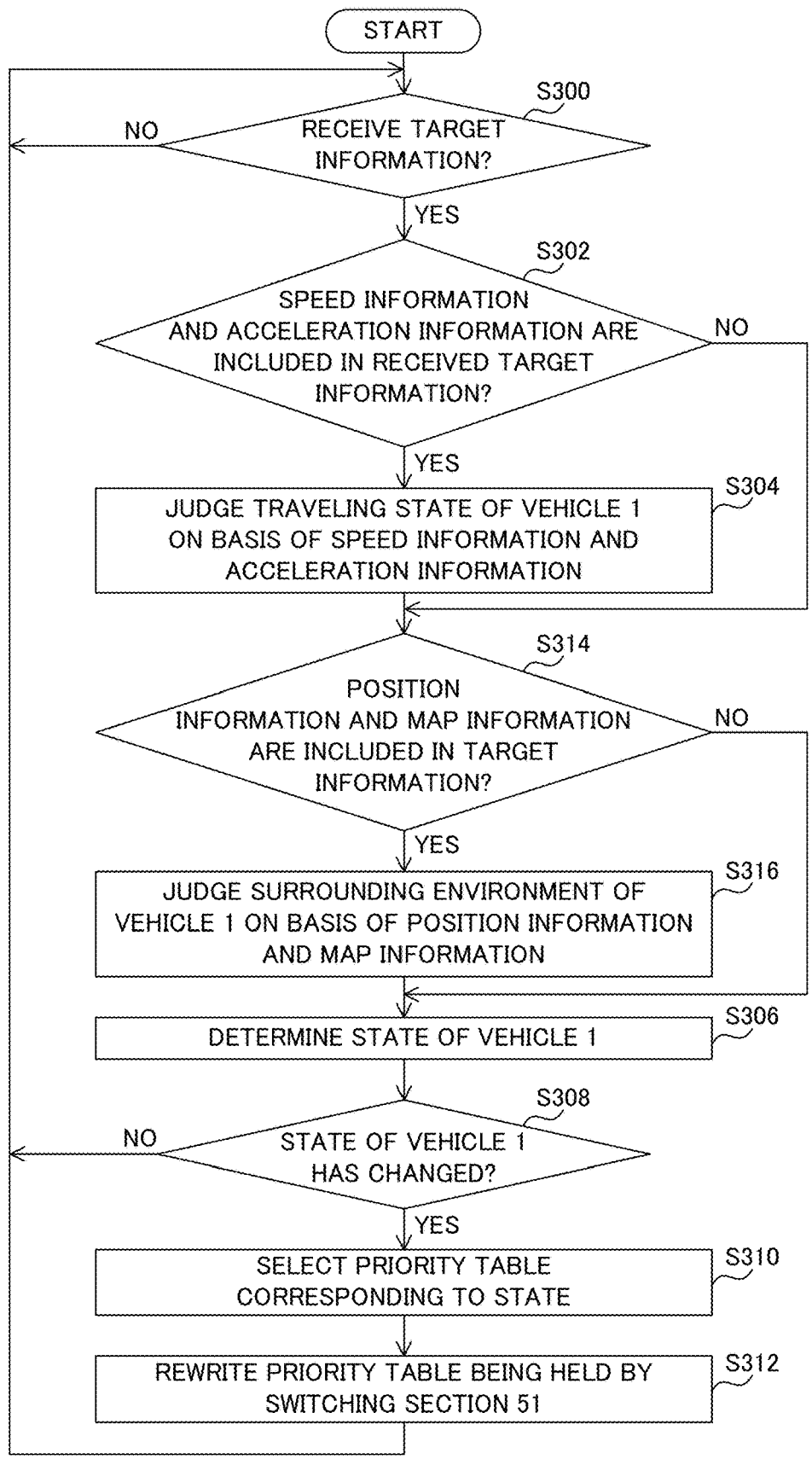
FIG. 10 is a flow chart specifying the operation procedure at the time when the switch device in the on-vehicle communication system according to the embodiment of the present disclosure determines the priority levels of communication data.

FIG. 10 is a flow chart specifying the operation procedure at the time when the switch device in the on-vehicle communication system according to the embodiment of the present disclosure determines the priority levels of communication data.

Referring to FIG. 10, the switch device 101 first stands by until the device receives target information, more specifically, at least either the speed information and the acceleration information or the position information and the map information (NO at step S300).

After that, the switch device 101 receives the target information (YES at step S300), and in the case that the speed information and the acceleration information are included in the received target information (YES at step S302), the switch device 101 judges whether the traveling state of the vehicle 1 is "traveling" or "stopped" on the basis of the speed information and the acceleration information (at step S304).

Furthermore, in the case that the position information and the map information are included in the target information (YES at step S314), the switch device 101 judges whether the vehicle 1 is positioned on "ordinary road" or in "parking lot" (at step S316).

Next, the switch device 101 determines the state of the vehicle 1 on the basis of the most recent judgment result (at step S306).

Next, in the case that the state of the vehicle 1 has changed (YES at step S308), the switch device 101 selects the priority table corresponding to the current state of the vehicle 1 from among the priority tables Tab 11, Tab 12, Tab 21 and Tab 22 included in the priority matrix M1 (at step S310).

Next, the switch device 101 rewrites the content of the priority table being held by the switching section 51 with the content of the selected priority table (at step S312).

Next, the switch device 101 rewrites the content of the priority table being held in the switching section 51 (at step S312), or in the case that the state of the vehicle 1 does not change (NO at step S308), the switch device 101 stands by until the device receives new target information (NO at step S300).

Although the acquisition section 52 in the switch device according to the embodiment of the present disclosure is configured so as to acquire the state information S1 indicating the degree of wobbling of the vehicle 1, the configuration of the device is not limited to this configuration. The acquisition section 52 may also be configured so as to acquire the state information S1 and the environmental information.

Furthermore, although the on-vehicle communication system according to the embodiment of the present disclosure is configured so that the out-of-vehicle communication device 111A, the sensor 111B, the driving assist device 111C, the camera 111D, the navigation device 111E, the central gateway 111F and the alarm device 111G are provided as the function sections 111, the configuration of the system is not limited to this configuration. The on-vehicle communication system 301 may also be configured so that the devices different from the above-mentioned devices are provided as the function sections 111.

Moreover, although the on-vehicle communication system according to the embodiment of the present disclosure is configured so that the communication between the switch device 101 and the function sections 111 is performed by wire using the Ethernet cables 10, the configuration of the system is not limited to this configuration. The system may also be configured so that the communication between the switch device 101 and the function sections 111 is performed wirelessly.

In the on-vehicle network described in patent document 1, however, a communication gateway for relaying information from the on-vehicle control device is provided.

For example, priority levels are sometimes set for various pieces of information to be relayed by the communication gateway. The communication gateway preferentially relays pieces of information having higher priority levels.

However, some pieces of information are not suited to be used while the priority levels thereof are fixed. More specifically, for example, in image recognition, since the object recognition rate in an image changes depending on the brightness in the surroundings of the vehicle, if image information is used while the priority level thereof is fixed, the image information is sometimes transmitted preferentially even in the case that the surroundings of the vehicle become dark and there is a piece of information that should be more preferentially transmitted than the image information. In this case, information transmission efficiency is lowered.

On the other hand, in the switch device according to the embodiment of the present disclosure, the acquisition section 52 acquires the environmental information indicating the surrounding environment of the vehicle 1 provided with the plurality of function sections 111. The switching section 51 performs relay processing for relaying communication data from the function sections 111 to the other function sections 111. And then, the setting section 55 sets the priority level of the communication data in the relay processing on the basis of the environmental information acquired by the acquisition section 52.

With this configuration, the priority level of communication data can be raised or lowered depending on the surrounding environment of the vehicle 1; in other words, the priority level of information can be applied flexibly. Hence, for example, in the case that there is information that should be transmitted more preferentially than image information, the priority level of the image information can be lowered, whereby it is possible to avoid a situation in which the information that should be transmitted preferentially is not transmitted or the transmission of the information is delayed. Consequently, information can be transmitted efficiently in the on-vehicle network.

Furthermore, in the switch device according to the embodiment of the present disclosure, the setting section 55 determines whether the priority level of the communication data from the camera 111D serving as a photographing device is higher or lower than the priority level of the communication data from the sensor 111B serving as a radar device on the basis of the illuminance IL in the surroundings of the vehicle 1 indicated by the environmental information.

As described above, since the switch device is configured so as to determine whether the priority level of the communication data from the camera 111D in which the recognition rate of an object changes depending on the illuminance IL in the surroundings of the vehicle 1 is higher or lower than the priority level of the communication data from the sensor 111B capable of recognizing an object regardless of the illuminance IL in the surroundings of the vehicle 1, the device can determine the respective priority levels appropriately.

Moreover, in the switch device according to the environment of the present disclosure, the acquisition section 52 further acquires the state information S1 indicating the degree of wobbling of the vehicle 1. After that, the setting section 55 sets the priority level of the communication data in the relay processing on the basis of the degree of wobbling indicated by the state information S1 acquired by the acquisition section 52.

With this configuration, the priority level of the communication data can be raised or lowered depending on the degree of wobbling of the vehicle 1; in other words, the priority level of information can be applied flexibly.

What's more, in the switch device according to the environment of the present disclosure, the vehicle 1 is provided with the out-of-vehicle communication device 111A serving as one of the function sections 111 and being capable of communicating with the server 171 outside the vehicle 1. Still further, in the case that the degree of wobbling satisfies a predetermined condition, the setting section 55 raises the priority level of the communication data to be transmitted between the setting section and the out-of-vehicle communication device 111A.

With this configuration, for example, in the case that an earthquake is detected on the basis of the degree of wobbling of the vehicle 1 and the detection is notified to the server 171 via the out-of-vehicle communication device 111A, when the degree of wobbling satisfies the predetermined condition, the earthquake detection information can be preferentially transmitted to the out-of-vehicle communication device 111A, whereby the detection result can be promptly transmitted to the server 171.

What's more, in the switch device according to the embodiment of the present disclosure, the acquisition section 52 further acquires the state information S2 indicating the traveling state of the vehicle 1. After that, the setting section 55 sets the priority level depending on the combination of the surrounding environment indicated by the environmental information acquired by the acquisition section 52 and the traveling state indicated by the state information S2 acquired by the acquisition section 52.

Even in the same surrounding environment of the vehicle 1, a case is conceivable in which the priority level should be changed depending on the traveling state. Also in this case, an appropriate priority level can be set depending on the surrounding environment and the traveling state.

Furthermore, in the switch device according to the embodiment of the present disclosure, the acquisition section 52 acquires the state information S1 indicating the degree of wobbling of the vehicle 1 provided with the plurality of function sections 111. The switching section 51 performs relay processing for relaying communication data from the function sections 111 to the other function sections 111. And then, the setting section 55 sets the priority level of the communication data in the relay processing on the basis of the degree of wobbling indicated by the state information S1 acquired by the acquisition section 52.

With this configuration, the priority level of communication data can be raised or lowered depending on the degree of wobbling of the vehicle 1; in other words, the priority level of information can be applied flexibly. Hence, in the case that there is information that should be transmitted preferentially, the priority level of the information can be raised, whereby it is possible to avoid a situation in which the information is not transmitted or the transmission of the information is delayed. Consequently, information can be transmitted efficiently in the on-vehicle network.

Moreover, in the switch device according to the embodiment of the present disclosure, the state information S2 indicating the traveling state of the vehicle 1 provided with the plurality of function sections 111 is acquired. The switching section 51 performs relay processing for relaying communication data from the function sections 111 to the other function sections 111. And then, the setting section 55 sets the priority level of the communication data in the relay processing on the basis of the state information S2 acquired by the acquisition section 52.

With this configuration, the priority level of the communication data can be raised or lowered depending on the traveling state of the vehicle 1; in other words, the priority level of information can be applied flexibly. Hence, in the case that there is information that should be transmitted preferentially, the priority level of the information can be raised, whereby it is possible to avoid a situation in which the information is not transmitted or the transmission of the information is delayed. Consequently, information can be transmitted efficiently in the on-vehicle network.

It is assumed that the above-mentioned embodiment is merely an example in all respects and not to be understood as limiting. The scope of the present disclosure is not defined by the above description, but by the appended claims, and includes all the changes within the meanings and ranges equivalent to the claims.

The above-mentioned description includes the features appended in the following supplementary notes.

[Supplementary Note 1]

A switch device being equipped with:

an acquisition section for acquiring environmental information indicating the surrounding environment of a vehicle provided with a plurality of function sections, a switching section for performing relay processing for relaying communication data from at least one of the function sections to at least one of the other function sections, and a setting section for setting the priority level of the communication data in the relay processing on the basis of the environmental information acquired by the acquisition section, wherein the vehicle is provided with an out-of-vehicle communication device, a sensor, a driving assist device, a camera, a navigation device, a central gateway or an alarm device as the function sections, the out-of-vehicle communication device is a TCU (Telematics Communication Unit) and can perform wireless communication with a wireless base station device according to a communication standard, such as LTE (Long Term Evolution) or 3G, the communication data is image information, sensor information, map information, update information, theft prevention information, inter-vehicle information or earthquake detection information, the switching section relays the image information from the camera to the driving assist device, the switching section relays the sensor information from the sensor to the driving assist device, the switching section relays the map information from the out-of-vehicle communication device to the navigation device, the switching section relays the update information from the out-of-vehicle communication device to the central gateway, the switching section relays the theft prevention information from the central gateway to the out-of-vehicle communication device, the switching section relays the inter-vehicle information from the out-of-vehicle communication device to the driving assist device, and the switching section relays the earthquake detection information from the alarm device to the out-of-vehicle communication device.

[Supplementary Note 2]

A switch device being equipped with:

an acquisition section for acquiring state information indicating the degree of wobbling of a vehicle provided with a plurality of function sections, a switching section for performing relay processing for relaying communication data from at least one of the function sections to at least one of the other function sections, and a setting section for setting the priority level of the communication data in the relay processing on the basis of the state information acquired by the acquisition section.

[Supplementary Note 3]

A switch device being equipped with:

an acquisition section for acquiring state information indicating the traveling state of a vehicle provided with a plurality of function sections, a switching section for performing relay processing for relaying communication data from at least one of the function sections to at least one of the other function sections, and a setting section for setting the priority level of the communication data in the relay processing on the basis of the state information acquired by the acquisition section.

[Supplementary Note 4]

The switching section described in Supplementary note 3, wherein the setting section sets the priority level on the basis of the traveling state indicated by the state information and the duration time of the traveling state.

DESCRIPTION OF REFERENCE NUMERALS

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A switch device comprising:

an acquisition section for acquiring at least one of environmental information and state information, the environmental information indicating a surrounding environment of a vehicle provided with a plurality of function sections, the state information indicating a traveling state of the vehicle, a switching section for performing relay processing for relaying communication data from at least one of the function sections to at least one of the other function sections, a priority table indicating a correspondence relationship among a type of the communication data and a priority level of the communication data in the relay processing, and a setting section for changing the priority level in the priority table on the basis of at least one of the environmental information and the state information acquired by the acquisition section.

2. The switch device according to claim 1, wherein
the setting section determines whether the priority level of the communication data from the function section serving as a photographing device is higher or lower than the priority level of the communication data from the function section serving as a radar device on the basis of an illuminance in surroundings of the vehicle indicated by the environmental information.

3. The switch device according to claim 1, wherein
the state information indicates a degree of wobbling of the vehicle, and
the setting section determines the priority level on the basis of the degree of wobbling indicated by the state information acquired by the acquisition section.

4. The switch device according to claim 3, wherein
the vehicle is provided with an out-of-vehicle communication device serving as one of the function sections and being capable of communicating with an external device outside the vehicle, and
in the case that the degree of wobbling satisfies a predetermined condition, the setting section raises the priority level of the communication data to be transmitted between the switching section and the out-of-vehicle communication device.

5. The switch device according to claim 1, wherein
the setting section determines the priority level depending on a combination of the surrounding environment indicated by the environmental information acquired by the acquisition section and the traveling state indicated by the state information acquired by the acquisition section.

6. A communication control method in a switch device including:
a step of acquiring at least one of environmental information and state information, the environmental information indicating a surrounding environment of a vehicle provided with a plurality of function sections, the state information indicating a traveling state of the vehicle,
a step of performing relay processing for relaying communication data from at least one of the function sections to at least one of the other function sections, and
a step of changing a priority level in a priority table on the basis of at least one of the acquired environmental information and the acquired state information, the priority table indicating a correspondence relationship among a type of the communication data and the priority level of the communication data in the relay processing.

7. A non-transitory computer readable storage medium storing a communication control program for use in a switch device, making a computer function as:
an acquisition section for acquiring at least one of environmental information and state information, the environmental information indicating a surrounding environment of a vehicle provided with a plurality of function sections, the state information indicating a traveling state of the vehicle,
a switching section for performing relay processing for relaying communication data from at least one of the function sections to at least one of the other function sections,
a priority table indicating a correspondence relationship among a type of the communication data and a priority level of the communication data in the relay processing, and
a setting section for changing the priority level in the priority table on the basis of at least one of the environmental information and the state information acquired by the acquisition section.

* * * * *